United States Patent [19]

Patterson et al.

[11] 4,101,958

[45] Jul. 18, 1978

[54] APPARATUS AND METHOD FOR EFFECTING REDUNDANT CONTROL DATA TRANSFER IN A DIGITAL FLIGHT CONTROL SYSTEM

[75] Inventors: Robert A. Patterson, Marion; Larry D. Lacy, Cedar Rapids, both of Iowa

[73] Assignee: Rockwell International Corporation, El Segundo, Calif.

[21] Appl. No.: 829,757

[22] Filed: Sep. 1, 1977

[51] Int. Cl.² .................. G06F 15/50; G06F 3/00; G06F 11/08

[52] U.S. Cl. .................. 364/200; 235/307; 364/424

[58] Field of Search .................. 235/306, 307; 364/200 MS, File, 900 MS File, 119, 427, 428, 432, 433, 434, 439, 443, 424

Primary Examiner—James D. Thomas

Attorney, Agent, or Firm—Richard A. Bachand; H. Frederick Hamann

[57] ABSTRACT

Apparatus for controlling the data exchange among redundant computation channels for use such as in a digital flight control system includes a register into which a tic is entered when selected data is written into a main memory, the position of the tic in the register corresponding positionally to the address of the main memory at which the data is being written. Subsequently, the tic containing register is searched, and when a tic is found, the data is retrieved from the main memory. The data thus retrieved is multiplexed in sets with raw sensor data and transmitted to the other redundant channels in serial format. The tic register in one embodiment is a RAM addressable concurrently with the main memory.

18 Claims, 5 Drawing Figures

APPARATUS AND METHOD FOR EFFECTING REDUNDANT CONTROL DATA TRANSFER IN A DIGITAL FLIGHT CONTROL SYSTEM

BACKGROUND OF THE INVENTION

1. Field of Invention

This invention relates to improvements in aircraft flight control systems, and, more particularly, to improvements in interchannel data transfer techniques to facilitate dependent redundant computation operations in each channel.

2. Description of the Prior Art

Digital implementation of aircraft flight control systems has been becoming of increased interest, since such digitally implemented systems are generally regarded as being more efficient and more versatile than their analog counterparts, especially in view of the programmable capabilities of many computers characteristically used with such digital systems.

Typical flight control systems use dual, or, often times, triple redundant data receiving, computing, and outputting channels or paths. In one prior art system, for instance, described by J. C. Hall in a technical report published May 23, 1975, entitled *Digital Flight Control for Transport Aircraft: An Approach to Efficient Design,* at 6-1 et seq., a set of triple sensors are employed, each independent from the other, to produce desired independent measurements of such parameters as air speed, radio altitude, rate of descent, and the like. The outputs from the triple sensors are each directed to a respective associated computation channel which processes the data in a desired manner. Additionally, the data derived from the sensors associated with the other computation channels is exchanged among the channels, and the exchanged information is additionally processed within each channel. Thus, for example, typically each channel will receive data inputs from each of the three selected sensor inputs to produce three independent and comparable processed information indications. It can be seen that if one of the sensors fails, that fact will be readily apparent in each of the processing channels, since each channel will be processing the same erroneous data. By the provision of an appropriate computer algorithm, the fact that erroneous data is being received and processed can be readily determined to eliminate that sensor's data from the data computation channels. Since there would remain two operative sensors, the overall system would remain operational, despite the sensor failure.

In addition, the computed information from each computation channel is circulated or exchanged among each of the other computation channels, in a manner like that of the sensor data exchange. Thus, each of the computation channels can monitor itself and the other channels, such that if one of the channels were to fail, the failing channel can be readily identified, and its computational results discarded so as not to affect the flight control provided by the system.

The triple computation channels, each presented with triple redundant computed information, each computed from triple redundant sensor information, can, if desired, then be individually voted upon within the individual computation channels to determine the most likely correct information for controlling each appropriate aircraft control surface. Triple output channels may also be provided, one for each respective computation channel, to provide votable output signals to manipulate a single control surface, such as aileron, rudder, trim tab, or the like.

It can be appreciated that by virtue of the triple redundant operation throughout the system, a truly "fail-operative" system can be achieved, that is, a system in which the failure of one sensor, or even one entire computation channel, or one output channel, will not affect in any way the overall operation of the system. This is essential to minimize the possibility of an uncontrolled "hardover" condition.

However, it can be seen that because of the triple redundant nature of the overall system, a large amount of data must be continuously rapidly circulated and processed. This is especially true if a large number of input sensors are anticipated, such as may typically be encountered in a flight control system on, for example, a wide body commercial jet. This problem is recognized in a technical report by J. C. Hall entitled *Air Transport Flight Control: Progress from Analog-to-Digital Implementation,* at 4-10.

In the prior art, this has been handled at two levels, as discussed by D. W. Mineck in his paper entitled *Redundant Digital Flight Control: Cost Performance Trade Offs,* Aug. 16, 1976. For instance, FIG. 15 of this paper discloses that, at the sensor input level, the sensor data is first digitized and applied to a shift register. The data is circulated within the shift register, and detected bit at a time for serial transmission to the other computation channels. After the data has been entirely circulated within the shift register, it is stored in a preassigned memory location in the respective associated memory unit of the computation channel. Concurrent with this data circulation, the data is serially transmitted to corresponding memory locations in the other computation channels. At the computed information level, the processed data is stored in a preassigned memory location in each respective data channel. When it is desired to transmit the data to the other computation channels, the data is moved into a specific memory section in this computation channel. Then, within the transmitting section, the data is recalled, formatted into a serial configuration, and transmitted to the other computation channels. Upon reception of the data in the other computation channels, the data is stored in the main memory associated therewith.

Because the data is transmitted in serial fashion, a large amount of time is required for its complete transfer, especially over a fairly large memory array of, for example, 64 words of 16 bits each. Typically, for example, the data when written in parallel into a memory can be achieved very fast, on the order of, for instance, one microsecond per word. Moving the serial data out, however, is comparatively slow, typically on the order of 100 microseconds per word. Thus, in systems in which large amounts of data are to be subjected to such interchannel exchange, many usable state-of-the-art computers are necessarily operated at or near their maximum data handling capabilities.

SUMMARY OF THE INVENTION

In light of the above, it is, therefore, an object of the invention to provide a data handling system for rapidly and efficiently effecting multi-channel data exchange.

It is another object of the invention to provide such data exchange system in which the data transfer can include data from the raw sensor data level as well as the computed data level.

It is another object of the invention to provide such data exchange independently of the operation of the CPU associated with the computation channel.

These and other objects, features, and advantages will become apparent to those skilled in the art from the following detailed description when read in conjunction with the accompanying drawings and appended claims.

BRIEF DESCRIPTION OF THE DRAWING

The invention is illustrated in the accompanying drawing, wherein.

In the various figures, like reference numerals are used to denote like parts. Additionally, in the drawing, for the sake of clarity, various circuit interconnections have been omitted, but are indicated by corresponding letters or abbreviations.

DETAILED DESCRIPTION OF THE PREFERRED EMBODIMENTS

Figure 1:
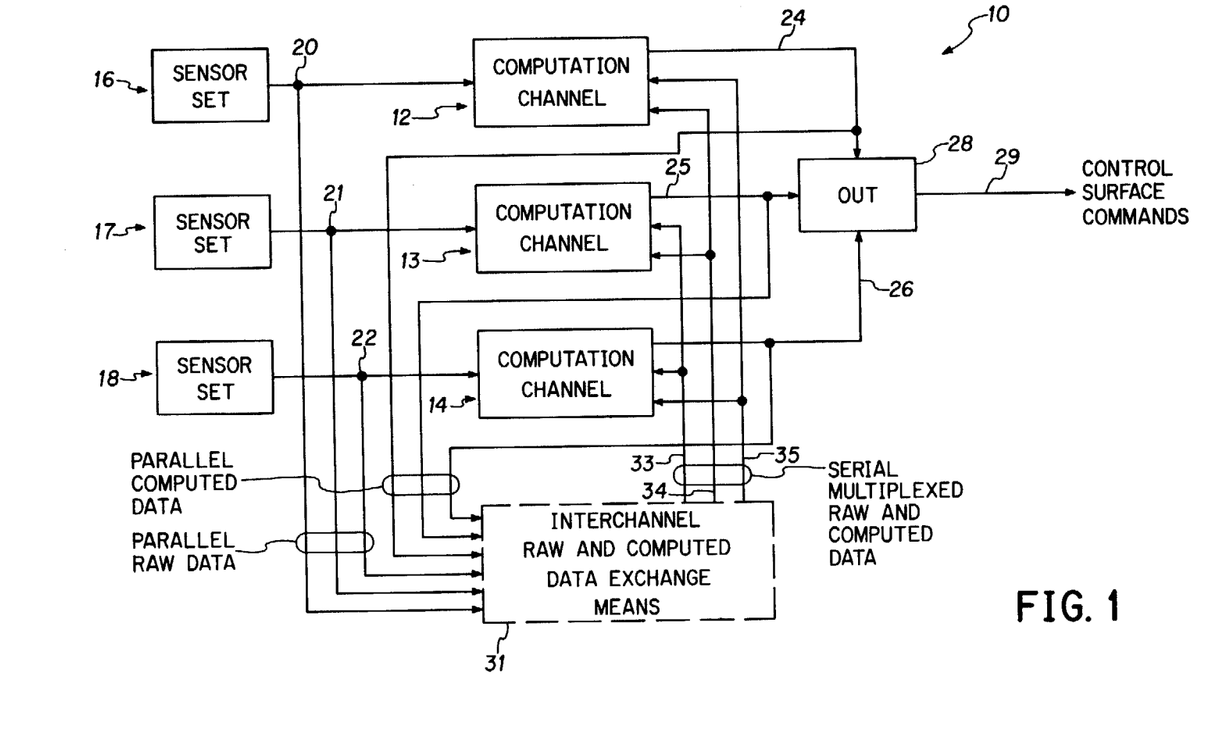
FIG. 1 is a block diagram illustrating the overall function and interrelationship of the various computation channels utilizing the interchannel raw and computed data exchange means in accordance with the invention, for use in a digital flight control system.

The overall goal achieved by the invention, illustrated broadly in FIG. 1, is a digital flight computer system 10, utilizing three redundant computation channels, 12, 13 and 14, each of identical construction and operation. Each of the computation channels 12-14 receives its "own" data input from a respective sensor set, 16-18, which may include appropriate data formatting circuits, such as A to D converters, or the like, to define the sensor data generated as inputs to the respective computation channels 12-14, on respective input lines 20-22, as below described. The sensors used in the sets are themselves well known in the art to derive relevant aircraft operating data, such as, altitude, air speeds, pitch attitude, roll attitude, yaw rate, etc., and are not described herein in detail.

The outputs upon lines 24-26 of the respective computation channels 12-14 are delivered to an output circuit 28 which delivers appropriate control surface commands upon the output line 29 to the control surface servos, or the like, as is known in the art. THus, each computation channel 12-14 is fully redundant in and of itself. But in addition, the parallel input data from the respective sensor sets 16-18 of each channel as well as the output of each computation channel is conducted as an input to the other computation channels. This interchannel exchange is performed by an interchannel raw and computed data exchange means or circuit 31, which provides serial multiplexed raw and computed data upon lines 33-35 back to the respective other of the computation channels 12-14. Thus, for example, the parallel raw data upon line 20 from the sensor set 16 would be converted by the interchannel raw computed data exchange means 31 into serial format and provided on line 33 to computation channels 13 and 14. The sensor data on lines 21 and 22 likewise are routed back to the other computation channels. In a similar fashion, the output from computation channel 13 upon line 25 is conducted to the interchannel raw and computed data exchange means to be directed to computation channels 12 and 14 upon lines 35, and so forth.

It should be noted that although the interchannel raw and computed data exchange means 31 is shown in FIG. 1 as conceptually being a single circuit, in practice, as will become apparent, each of the computation channels 12-14 has its own raw and computed data transmitters, which multiplex the raw and computed data in serial format for transmission to respective receivers of the other channels. This can be seen in greater detail in FIG. 2, below discussed.

Figure 2:
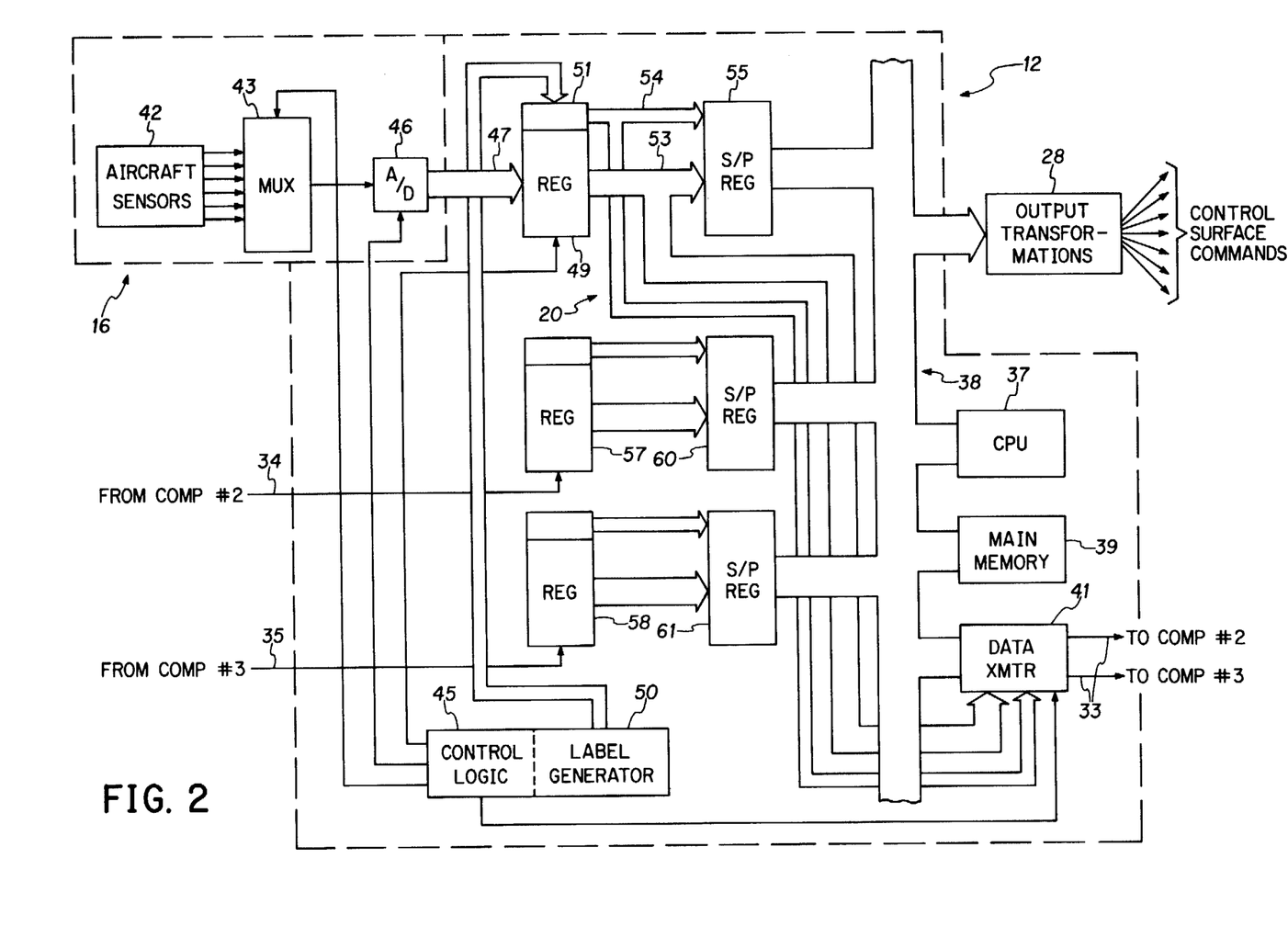
FIG. 2 is a box diagram of one channel of the redundant channel flight control system of FIG. 1, utilizing the multichannel data sharing and exchange system in accordance with the invention.

As shown, in FIG. 2, a single computation channel 12 includes a central processing unit (CPU) 37 connected to a bus 38, which, in the embodiment illustrated, is understood to include both the address and data buses, and is herein referred to as the transfer bus. A main memory 39 as well as a data transmitter 41 are connected to the transfer bus 38. The data transmitter 41 is a portion of the interchannel raw and computed data exchange means 31 shown in and described with respect to FIG. 1.

The primary or "own channel" inputs to the computation channel 12 are provided from the associated aircraft sensors 42, which generate the various inputs to a multiplexer 43. The multiplexer 43, under the control of control logic circuit 45, selects from the inputs one at a time for application to an analog-to-digital converter 46. The output from the A to D converter 46 is delivered on a data bus 47 to a parallel register 49, and, concurrently, an identifying label generated by a label generator circuit 50 is delivered to an address portion 51 of the register 49. The label generated by the label generator circuit 50 is also controlled as a part of the control logic circuit 45, to identify, for instance, which of the aircraft sensors is instantaneously being selected by the multiplexer circuit 43.

After the particular aircraft sensor data has been selected and labeled, it is conducted on a data bus 53 and an address bus 54 to a scratch pad register 55, which is a part of the computation channel 12. In addition, the raw sensor data is conducted on the data bus 53 and address bus 54 to the data transmitter circuit 41, for transmission to the other computation channels, as below described in detail.

The secondary or "other channel" inputs to the data channel 12 are derived from the data which is transmitted from the other computation channels 13 and 14 (see FIG. 1), received upon lines 34 and 35, in serial format, for entry into registers 57 and 58. After this data is fully received within the registers 57 and 58, it is moved in parallel form to scratch pad registers 60 and 61, respectively, which can be accessed by the CPU 37 upon the transfer bus 38. The CPU 37 is programmed in a manner presently performed in the art to process the raw data from the "own channel" sensors 42 as well as the "other channel" sensor data received upon lines 34 and 35, and is programmed, as well, to produce processed data in view of the various sensor data for transmission to the output transformations circuit 28 upon the transfer bus 38. In addition, the CPU 37 is programmed to process previously processed data from the other computation channels 13 and 14, also received on the lines 34 and 35. The program instructions upon which the CPU 37 operates may be conveniently contained at selected or preassigned addresses in the main memory 39 in a manner known in the art.

As will be described below, the data is transmitted among the computation channels in serial sets of serial data. That is, for example, four sets of raw sensor data may be sequentially transmitted and received among the computation channels followed by one set of processed data, followed by four sets of sensor data, and so on, all the data itself being in serial format.

Figure 3:
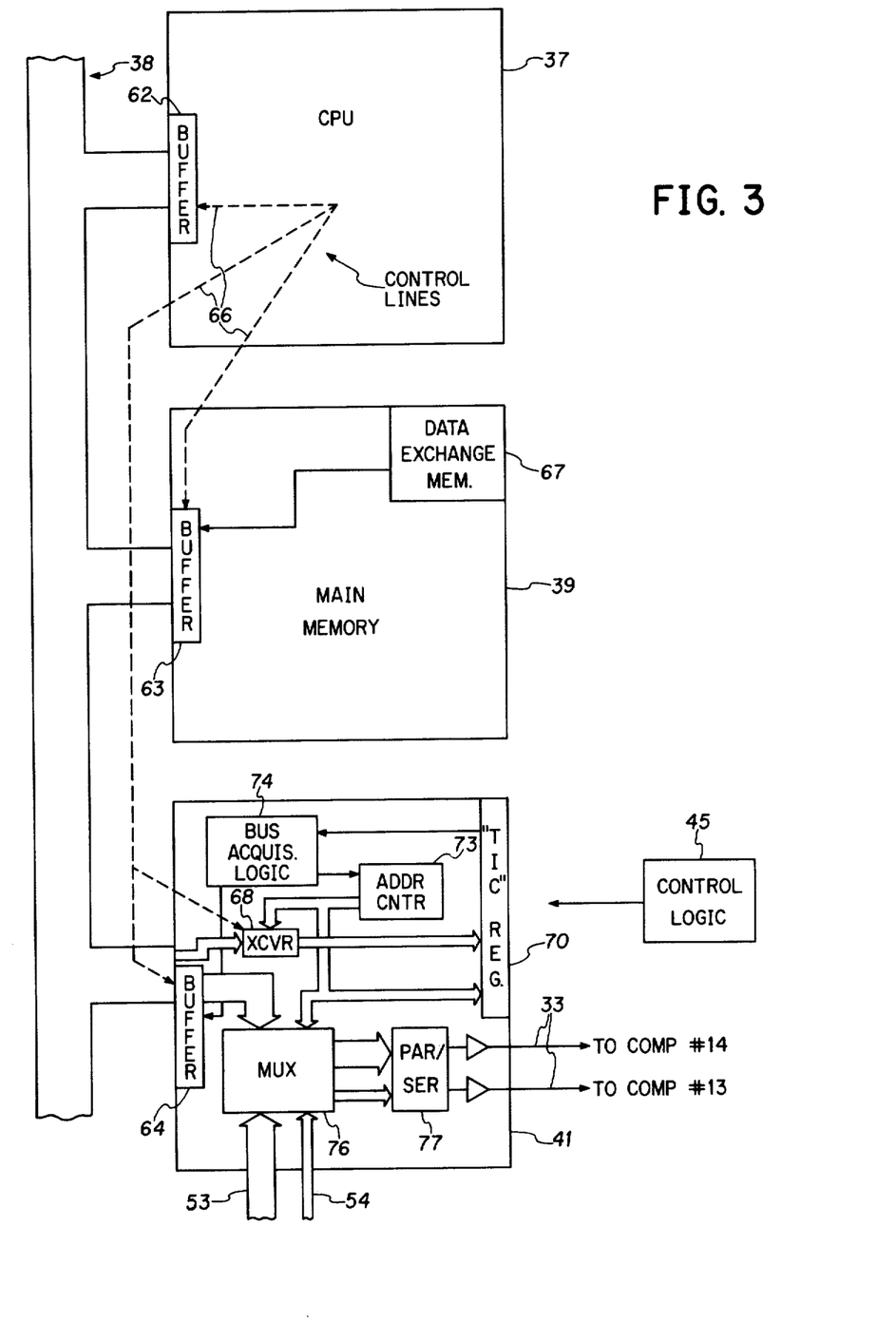
FIG. 3 is a block diagram of the memory, CPU, and data transmitter of FIG. 2, showing the overall interrelationship therebetween, and broadly, in box diagram form, the data transmitter, in accordance with the invention.

The CPU 37, main memory 39, and data transmitter 41 each communicate with the data and address buses of the transfer bus 38, as shown in FIG. 3. The CPU, memory, and data transmitter, each include tristate buffers 62, 63, and 64, respectively, to serve as an interface to the transfer bus 38, in a manner known in the art. The buffers 62-64 are controlled, in part, by control lines 66 as a result of operations within the CPU 37 (the control lines 66 are shown as dashed lines to reduce the complexity of the drawing, but are understood to include the usual number of required lines for operation of the tristate devices 62-64 and for the other usual control purposes).

With reference now to the data transmitter circuit 41 shown in FIG. 3 in block diagram form, briefly, when the CPU 37 writes data into the main memory 39, for example, in a portion 67 dedicated for handling the data to be exchanged, the tristate buffer 63 is activated, passing data into the main memory 39, and, also, the tristate buffer 64 of the data transmitter 41 is activated, passing the address then in use to the transceiver 68 for application to a "tic" register 70. The address applied to the tic register 70 will cause a particular logic state, for example, a true, high, or "1" state (herein referred to as a "tic") to be entered in the tic register at a location specified by the address delivered by the transceiver 68. Thus, as data is written into the data exchange memory portion 67, various tics are generated in specific locations of the tic register 70 corresponding to the addresses in the main memory at which data is written.

Subsequently, when it is desired to transfer the data from the data exchange memory 67 to corresponding memories of the other computation channels, as controlled by the control logic circuit 45, the tic register 70 is searched by applying sequential addresses to it from an address counter 73. Thus, as the addresses generated by address counter 73 sequence through those at which a tic might reside within the tic register 70, and when a tic is found, its presence causes the counter 73 to stop and actuates bus acquisition logic circuit 74 which requests a memory cycle. When the data transmitter is given access to the transfer bus 38, the address then existing in the address counter 73, corresponding to the location of the found tic is applied via the transceiver 68 to the transfer bus 38. The address is thus delivered onto the data transfer bus 38, and accesses the corresponding address in the data exchange portion 67 of the main memory 39, causing the data entered at that address to be placed onto the transfer bus 38 and delivered to the multiplexer circuit 76. In addition, the address from the address counter 73 is delivered to the multiplexer 76. The data, recalled or regenerated by the multiplexer 76 as well as the address from the address counter 73 are delivered to a parallel-to-serial converter 77, and are then passed in serial form onto the lines 33 for delivery to the other computation channels 13 and 14.

When the described computed data exchange is not taking place, the multiplexer 76 is configured to deliver the raw sensor data appearing on buses 53 and 54 to the parallel to serial converter 77 for transmission to the other computation channels 13 and 14. This is also controlled by the control logic circuit 45, which may, for example, permit the transmission of sequences of four sets of raw sensor data followed by one set of computer data during the continuous operation of the circuit.

Figure 4:
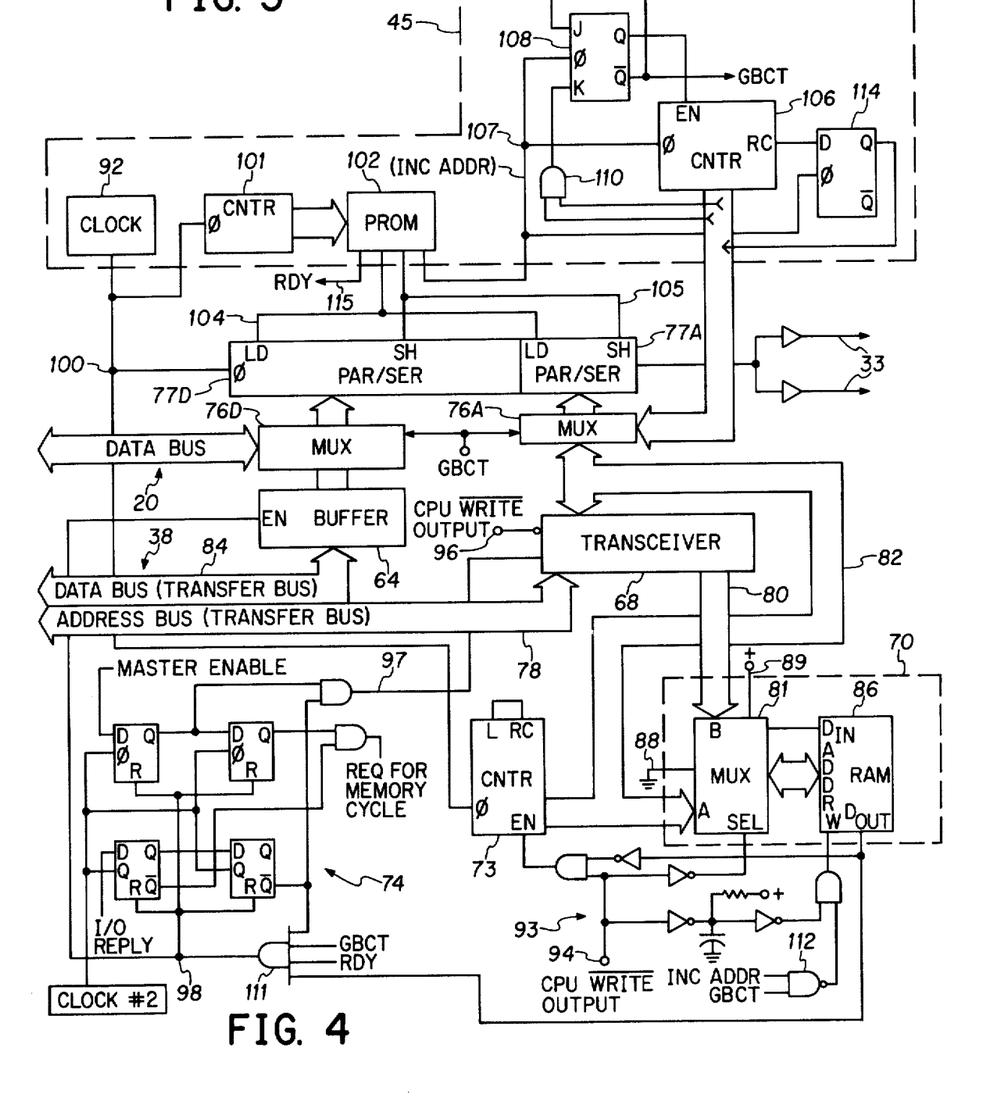
FIG. 4 is a detailed schematic diagram of the data transmitter of FIG. 3.

A detailed schematic diagram of the data transmitter circuit 41 is shown in FIG. 4. In the figure, where appropriate, the address and data portions of the registers or other circuits are denoted by letters A and D, respectively, following the identifying numeral. As shown, the data bus portion 84 of the transfer bus 38 is connected to the buffer circuit 64, thence to a multiplexer 76D. The address bus portion 78 of the transfer bus 38 is applied to a transceiver 68 to enable address data to be received from the transfer bus address bus 78 or to deliver address data to it. The transceiver 68 is therefore connected to deliver address data on a bus 80 to a multiplexer 81. Additionally, transceiver 68 is connected to deliver address data received from a bus 82 back onto the address bus portion 78 of the transfer bus 38.

The tic register 70, in addition to the multiplexer 81, includes a RAM 86, which may be, for example, a 256 by 1 bit memory. The RAM 86 is connected to receive the data output from the multiplexer 81 on its address terminals, and, in addition, is connected to receive at its data input terminal either a logic low state 88 or logic high state 89, as selected by the multiplexer 81. Connected to one set of inputs of the multiplexer 81 is the output of a counter 73, which is clocked by clock pulses generated by a master clock 92. Thus, in normal operation, the output of the counter 73 is applied to the address terminals of the RAM 86 to sequentially search therethrough for the existence of a particular logic state, for example, a "1" on the data output terminal ($D_{OUT}$). The logic state is entered into the RAM by a tic register control circuit 93 which operates as follows. When the CPU 37 (see FIG. 3) writes data into the data exchange memory 67, it produces a state change upon a write terminal 94, as well as to a write terminal 96 connected to the transceiver 68. The state change is also conducted to the select terminal of the multiplexer 81 to select as its input the data appearing at the "B" input terminals as well as the high state appearing on terminal 89. Thus, at that time, the address data appearing on the address bus 78 is conducted through the transceiver 68, along the bus 80, through the multiplexer 81 to be applied to the address terminals of the RAM 86. Concurrently, the high state on the terminal 89 is conducted to the data input terminal of the RAM 86, to thereby enter the tic at that selected address, to indicate that data has been written at the particular corresponding address in the data exchange memory 67. While this process is going on, the counter 73 is disabled from continuing its usual advancing count. Thereafter, at the termination of the write cycle, the circuit is returned to normal, with the multiplexer 81 being configured to apply the data appearing at the output of the counter 73 at its "A" input terminal to the address terminals of the RAM 86 together with the ground state 88. The counter 73 then proceeds its advancing count in search for previously written tics within the RAM 86.

When, in the normal operation of the circuit, a tic or mark is found within the RAM 86, it appears at the data output terminal thereof, to thereby disable further advancing count of the counter 73 as mentioned. In addition, it is conducted to the bus acquisition logic circuit 74. If the other conditions necessary to enable the generation of a request for a memory cycle are present, as below further outlined, an output will appear upon the line 97 from the bus acquisition logic circuit 74, to configure the transceiver 68 to deliver the data on the bus 82 generated by the counter 73 onto the address portion 78 of the transfer bus 38. Concurrently, the buffer circuit 64 will be enabled by an enable pulse on line 98 to apply the data recalled from the memory at the selected address and delivered on the data bus portion 84 of the transfer bus 38 to be passed to the multiplexer 76D. Thus, with the data and its regenerated address appearing at the output terminals of the multiplexer 76, the entire data word is loaded into the parallel-to-serial converter 77 to subsequently be shifted from the circuit upon lines 33 for delivery to the other computation channels 13 and 14. Also, the tic mark is reset to allow the continued search of the RAM 86.

The bus acquisition logic circuit 74 is merely a timing coordinating circuit comprising D flip-flops and clock of appropriate frequency to ensure that the accessed logic and control states are established in the proper order. The input labeled "master enable" is derived from an allocation, arbitration and contention logic determining circuit (not shown) in response to the output labeled "request for memory cycle" to assure that the transfer bus is not tied up when a higher priority data handling routine is being effected. The input labeled "I/O reply" is a control signal which indicates the desired data is available on the transfer bus, and is generated in a standard manner.

Figure 5:
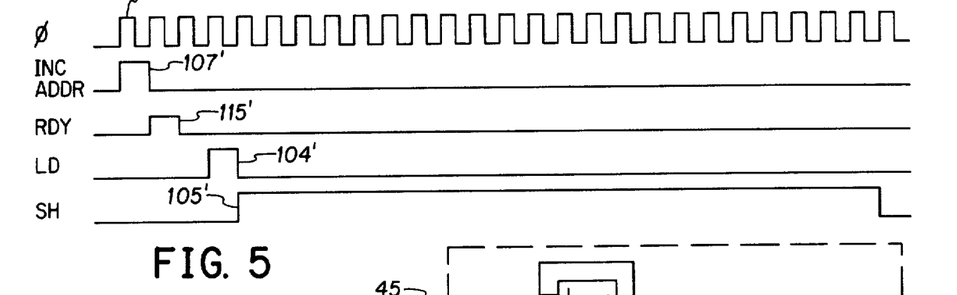
FIG. 5 is a series of waveforms showing the timing pulses employed in the operation of the data transmitter of FIG. 4.

The serial shifting of the data within the parallel-to-serial converter 77 is controlled by the clock 92, which produces pulses as shown by the curve 100', shown in FIG. 5. The output from the clock 92 is applied to a counter 101 which produces a digital output count to address a PROM 102. The PROM 102 has been preprogrammed to generate particular outputs in correspondence to the inputs at the address terminals generated by the signals from the counter 101. In particular, with respect to the loading and shifting operations of the computed or sensor data in the parallel-to-serial converter 77, as above described, a load pulse 104', shown in FIG. 5, is first delivered from one output terminal of the PROM 102 to the load (LD) terminals of the parallel-to-serial converter 77. Subsequently, a shift enable state, shown by the curve 105' in FIG. 5, is applied to the parallel-to-serial converter 77 to enable the digital word presently existent therein to be clocked from the converter 77 onto the lines 33 by the clock pulses 100' delivered from the clock generator 92.

To time multiplex the raw sensor data with the computed data, generated as above-described, a control logic circuit 45 is provided. The control logic circuit includes a counter 106 which receives incrementing clock pulses from an output of the PROM 102 at a desired rate. Such address incrementing pulse is denoted by curve 107', in FIG. 5. A J-K flip-flop 108 is provided, also clocked by the address increment pulse 107', and which changes states when a particular logic state derived from the output of the counter 106 is applied to its K input terminal. As shown, two of the output lines from the counter 106 may be combined in an AND gate 110 for application to the K terminal. Thus, any combination of counter outputs can be selected to produce a state change in the J-K flip-flop 108 after any preselected number of cycles. In a preferred embodiment in which it is desired to send four sets of raw sensor data for every set of computed data, the input to the J-K flip-flop 108 can be selected to produce a state change on its $\bar{Q}$ output terminal after each four cycles. This state, denoted by the letters GBCT, is conducted to an AND gate 111 to enable the operation of the bus acquisition logic 74 and to a NAND gate 112 in the tic register control circuit 93. Finally, a D flip-flop 114, clocked by the address increment pulse 107', is connected to receive at its data input the ripple carry output of the counter 106. The Q output of the D flip-flop 114 provides a state to the address bus defined by the output of the counter 106.

This portion of the circuit operates, therefore, to deliver increasing addresses, or labels, via the multiplexer circuit 76A to an address portion of the parallel-to-serial converter 77A to be associated with the raw sensor data on the bus 20 applied to the data portion of the multiplexer 76D and parallel-to-serial converter 77D. Thereafter, upon the application of the load and shift pulses 104' and 105', the raw data sets are serially clocked from the register 77 onto the lines 33 and transmitted to the computation channels 13 and 14. Every fourth cycle (or other selected number of cycles), when the J-K flip-flop 108 changes state, the tic register cycle is executed, to transmit computed data from the identified memory locations in the data exchange memory 67, as above described.

It should finally be noted that in addition to the other pulses generated in the operation of the circuit of FIG. 4, a "ready" pulse 115' is generated upon an output line from the PROM 102. The "ready" pulse 115' is delivered to the AND gate 111 of the bus acquisition logic circuit 74, and serves to synchronize the transmission of the computed data with the following load and shift pulses generated by the PROM 102.

Although the invention has been described and illustrated with a certain degree of particularly, it is understood that the present disclosure has been made by way of example only, and that numerous changes in the arrangement and combination of parts may be resorted to by those skilled in the art without departing from the spirit and scope of the invention as hereinafter claimed.

We claim:

1. A method for transferring selected data words from one computation channel to another, redundant channel, each of said computation channels having a data receiving main memory into which the data words are written under the control of a CPU, comprising:
   (a) entering indicators into a first register as each of said selected data words is being written in the main memory, the location of each said indicators corresponding to the address in the main memory where a data word is being written;
   (b) while said CPU is operating, scanning the first register until an indicator is found;
   (c) stealing one memory cycle and transferring into a second register the data from the main memory location corresponding to the location of the indicator found;
   (d) thereafter serially clocking the data from the second register to a data receiver associated with the other redundant channel;

(e) removing said indicator found from said first register; and (f) repeating steps (a) through (e).

2. The method of claim 1 wherein said entering step comprises:

operating a RAM having address terminals and data input and output terminals as the first register, wherein the main memory address is applied to the address terminals and a logic state is entered into the data input terminal of the RAM when a data word is being written into the main memory;

and wherein said scanning step comprises:

generating a count signal;

applying the generated count signal to the address terminals of the RAM, whereby a generated count signal which produces an output upon the output terminal of the RAM corresponds to the main memory address of a data word.

3. A method for transmitting computed and raw data words from one computation channel to another, redundant channel, each of said computation channels having a data receiving main memory into which the computed data words are written under the control of a CPU and a bus for carrying the raw data independently of the CPU for entry into a scratch pad register to await processing by the CPU, comprising:

(a) conducting the raw data into a transmitting register for transfer to a receiver associated with the other redundant channel, while said CPU is operating:

(b) entering an indicator into a first register as each computed data word is being written in the main memory, the location of each indicator corresponding to the address in the main memory where the data word is being written;

(c) scanning the first register until an indicator is found;

(d) intermittently interrupting the transmission of the raw data, stealing one memory cycle, and transferring the data from the location of the main memory corresponding to the location of the indicator found into the transmitted register;

(e) removing said indicator found from said second register, and (f) repeating steps (a) through (e) for updating the computed and raw data words.

4. The method for operating a digital flight control system, comprising:

(a) providing at least two redundant computation channels, each generating computed data, and collectively providing aircraft control surface commands;

(b) providing individually derived raw data sensor input signals to each of said at least two computation channels; and (c) exchanging between each of said at least two computation channels only selected addressively identified memory words, including at least the computed data generated by the computation channels.

5. The method of claim 4 wherein:

said step of providing at least two computation channels includes the steps of providing for each computation channel a main memory in which the computed data is addressively stored, and a CPU for processing the raw and exchanged data to generate computed data, and writing the computed data into the main memory as it is generated;

and wherein said exchanging step comprises repeatedly:

(a) converting said raw data to serial words, and transmitting the serial words to the other computation channels, (b) entering a mark in an indicator registor when computed data is written by the CPU in the main memory, the location of the mark corresponding to the address in main memory where the computed word is written, (c) searching the indicator register for an entered mark, (d) retrieving the computed data from the main memory at the address corresponding with the location of the mark found, (e) interrupting the transmission of the raw data, and (f) converting the retrieved computed word to a serial word, and transmitting the serial word to the other computation channels.

6. The method for exchanging data between redundant computation channels of a digital flight control system, comprising:

(a) continuously labeling sensor inputs with an identifier, sending the labeled inputs to each other computation channel, and entering the labeled inputs into each respective originating computation channel;

(b) processing the labeled inputs in each redundant channel to produce processed products therefrom;

(c) storing the processed products;

(d) retrieving selectively identified stored processed products, multiplexing the retrieved processed products with the labeled sensor inputs being transmitted, and transmitting the retrieved processed products to each other redundant computation channel.

7. The method of claim 6 further comprising:

providing an addressable memory means for storing the processed products, and generating memory address indicating signals when the processed products are stored in the memory means;

and wherein said retrieving step comprising retrieving the stored processed products in accordance with the generated memory address indicating signal.

8. The method of claim 7 further comprising:

providing a memory address indicating memory for receiving the memory address indicating signals at addresses associatable with the address locations of the memory means at which the processed products are stored.

9. The method of claim 8 further comprising formatting the labeled inputs and the processed products in serial form prior to sending to each other computation channel.

10. The method for combining the transmissions of raw sensor data and processed data among redundant computation channels of a digital flight control system, comprising:

continuously transmitting the sensor data to each computation channel;

recording an indicia of the entry of processed data into an addressable memory;

subsequently generating an address from the recorded indicia corresponding to an address of the addressable memory at which processed data has been entered;

supplying the generated address to the addressable memory at predetermined intervals of the transmission of the sensor data to recall from said addressable memory only the entered processed data for transmission during the predetermined interval.

11. In a digital flight control system of the type which includes a plurality of redundant computation channels, a corresponding plurality of sensor data generators, each to provide sets of sensor data to a respective computation channel, each computation channel including a digital computer programmed to process the respective sets of sensor data to produce sets of processed data, and to process sets of processed data of the other digital computers of the other computation channels applied to it, the improvement comprising in combination therewith:

a plurality of means each associated with a respective computation channel, connected to receive said sets of sensor data from its respective computation channel, to transmit sensor data to each of the other of said computation channels, and for receiving the sets of processed data from its respective computation channel to transmit processed data to each of the other redundant computation channels, in serially transmitted sets of serial data.

12. The digital flight control system of claim 11 wherein said computation channels are three in number.

13. Apparatus for use in combination with a digital flight control system having a plurality of redundant computation channels each having a CPU for generating processed sensor data and for further processing processed data of other computation channels and a memory into which the generated and further processed data is written, comprising:

a register for receiving a logic state at selected locations therein, each of said selected locations corresponding to a respective address location in said memory;

means for entering the logic state into said register when the CPU writes data into a specified address of said memory, said logic state being entered at a selected location of said register corresponding to the specified address;

means for subsequently searching said register for the logic state and recalling the data from the address of the memory corresponding to the location of the found logic state.

14. The apparatus of claim 13 further comprising data transmitting means for transmitting the recalled data to the other redundant computation channels.

15. The apparatus of claim 14 further comprising multiplexing means for controlling signals to said transmitting means, and means for delivering sensor data and the recalled data to said multiplexing means, said multiplexing means being operational to deliver to said transmitting means said sensor data and recalled data in shared sequential turns.

16. The apparatus of claim 13 wherein said logic state receiving register comprises a RAM to which the address of the memory is applied when the CPU writes data therein, and means for writing the logic state into said RAM at said address.

17. The apparatus of claim 15 wherein said transmitting means comprises a parallel-to-serial shift register connected to receive the output of said multiplexing means, whereby said sensor data and recalled data are converted to serially formatted data for transmission by said transmitting means.

18. The apparatus of claim 16 wherein said means for searching said register comprises a counter connected to present its output count to address said RAM, and further comprising means connected to a data output of said RAM to detect the entered logic states, operative to discontinue the count of said counter when said entered logic state is detected.

* * * * *